United States Patent [19]

Luebbert et al.

[11] 4,093,395

[45] June 6, 1978

[54] DRILL AND COMBINED DRILL COUNTERSINK

[75] Inventors: William K. Luebbert, St. Louis County; Thomas O. Blankenship, Marthasville; Roy H. Freeman, St. Louis, all of Mo.

[73] Assignee: McDonnell Douglas Corporation, St. Louis, Mo.

[21] Appl. No.: 777,177

[22] Filed: Mar. 14, 1977

[51] Int. Cl.² .................... B23B 51/00; B23B 31/44
[52] U.S. Cl. .......................... 408/224; 408/199; 408/226
[58] Field of Search ............ 408/199, 211, 224, 225, 408/226

[56] References Cited

U.S. PATENT DOCUMENTS

| 158,958 | 1/1825 | McCrosson | 408/224 |
| 370,484 | 9/1887 | Latham | 408/225 |
| 512,198 | 1/1894 | Lewis | 408/226 |
| 2,878,809 | 3/1959 | Treace | 408/226 |
| 2,927,614 | 3/1960 | Ransom | 408/226 |

FOREIGN PATENT DOCUMENTS 656,841  1/1929  France ................ 408/211

OTHER PUBLICATIONS

Publication by Rupert LeGrand entitled "The New American Machinists Handbook," copyrighted 1955, pp. 2-23.

*Primary Examiner*—Harrison L. Hinson
*Attorney, Agent, or Firm*—Gravely, Lieder & Woodruff

[57] ABSTRACT

A drill for producing close tolerance holes in non-ferrous and non-metallic composite materials in which the essentially cylindrical size of the body of the drill is maintained all the way to the drilling point, the cylindrical shape as it approaches the drilling point is tapered by being flattened off on opposite sides to taper the body, and the drilling point has symmetrically formed and angularly related cutting edges in the opposite edges of the flattened and tapered body. The drill having the foregoing characteristics may be combined with a countersink formed either separately from or as an integral part of the drill.

7 Claims, 6 Drawing Figures

U.S. Patent  June 6, 1978  4,093,395
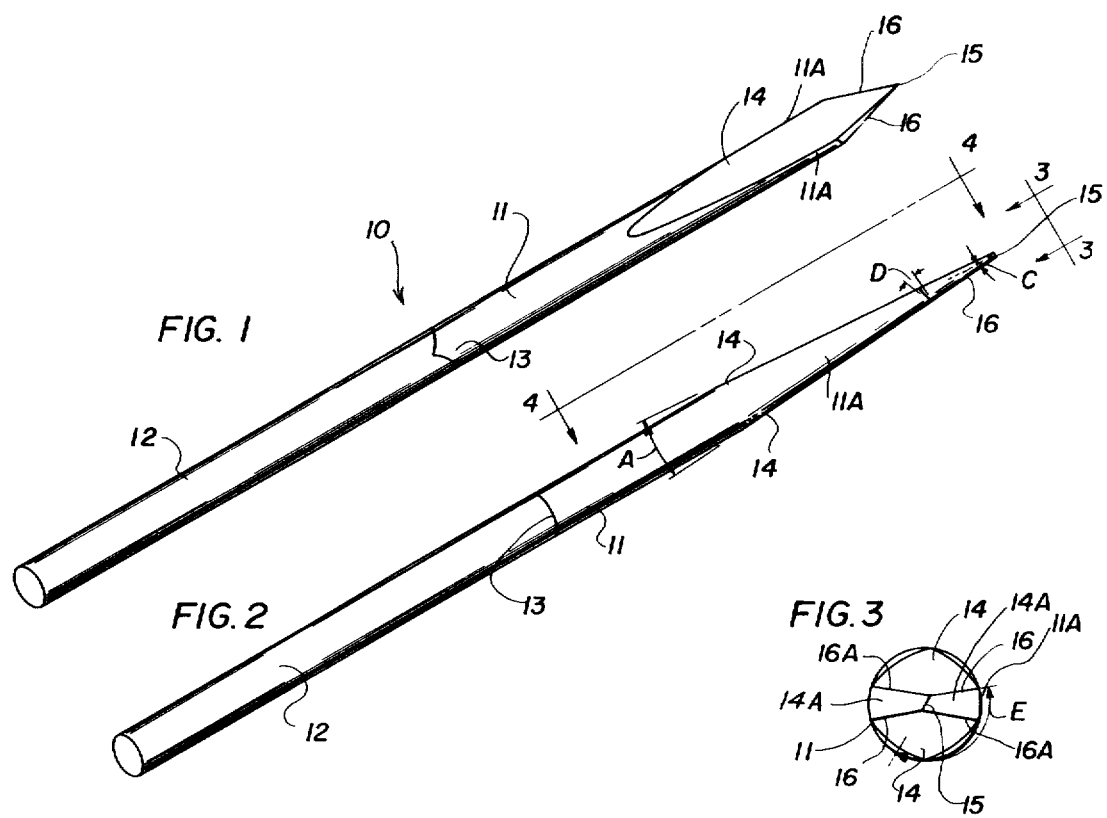
FIG. 1
FIG. 2
FIG. 3
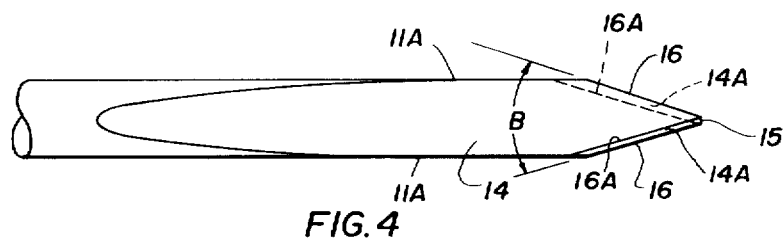
FIG. 4
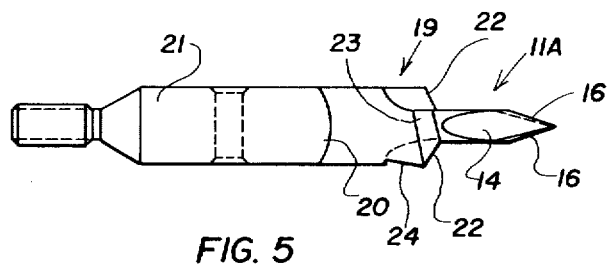
FIG. 5
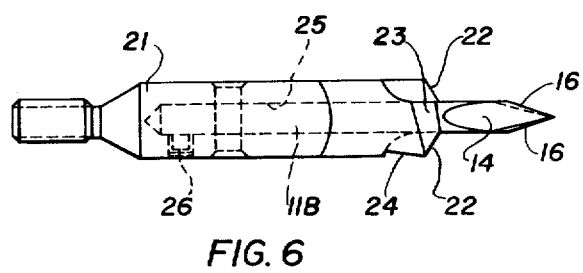
FIG. 6

DRILL AND COMBINED DRILL COUNTERSINK

BACKGROUND OF THE INVENTION

As new and improved materials are found to be useful and highly economical in the construction of many articles of commerce, the need to form holes in such materials, for various reasons, presents a whole new series of problems which do not appear to be met by the use of conventional tools. For example, in the important aerospace and aircraft industries important new materials are being found to meet the needs for the manufacture of improved airframe structures. The improved materials are brought forward to obtain lighter weight and increased strength parts at more economical rates. Some of the new materials are non-metallic composites in which laminations are built up to required thickness. Drilling holes in such composites presents a problem because of critical engineering requirements for the installation of fasteners. The highly abrasive characteristics of composites makes it necessary to depart from conventional tools which fail to produce the desired results. Conventional tools cause delamination of the composite material at the entrance and exit sides of a hole, excessive heat is produced in the composite material with conventional tools because of the abrasive qualities of the composites and conventional tool configuration, tool life is very short, feed rates with conventional tools are extremely low, and hole tolerance is difficult to obtain.

BRIEF DESCRIPTION OF THE INVENTION

This invention relates to a drill and combined drill countersink capable of producing holes in non-metallic composite and non-ferrous materials to extremely close tolerances, thereby precluding the need for subsequent reaming of the drilled holes to obtain precise size.

The object of this invention is to provide a unique drill having characteristics making it capable of producing high quality and close tolerance holes in non-ferrous and non-metallic composite materials, thereby overcoming the problem encountered with conventional drill tools having conventional configurations.

It is also an object of this invention to provide a unique configuration for a drill having flat sides, tapered surfaces and pointed cutting edges giving the drill a configuration that will permit drilling accurate hole sizes without delaminations in non-metallic composite or non-ferrous materials in an economical manner.

It is a further object of this invention to provide a drill and drill countersink combination for the purpose of producing an accurately sized hole with a countersink entrance in one drilling operation.

This invention has a further object the provision of a drill and drill countersink incorporating a drill point configuration which is economical to produce, as well as to recondition, and one which allows for rapid transfer of heat from the material being drilled to the tool.

A presently preferred embodiment of the invention comprises a cylindrical body formed with a drilling point having symmetrically shaped cutting edges directed at an acute angle to the longitudinal axis of the body and in which the body is formed with flat surfaces on opposite sides which are tapered to the thinnest section at the drilling point.

The improved drill and drill countersink of this invention is formed with opposite flat and tapering surfaces so as to permit the expulsion of material from the hole being drilling and in which the drilling point cutting edges have a negative rake angle combined with a high relief angle to prevent delamination when drilling composite material, and to obtain improved tool life.

BRIEF DESCRIPTION OF THE DRAWING

Presently preferred embodiments of the invention are set forth in the accompanying drawings wherein:

FIG. 1 is a perspective view of the improved drill showing the general configuration thereof;

FIG. 2 is a side elevation of the drill shown in FIG. 1;

FIG. 3 is an end view as seen from the drilling point along line 3—3 in FIG. 2 and illustrates the chisel point and the flat surfaces tapering to the chisel point;

FIG. 4 is an enlarged and fragmentary detailed view of the drilling point for the drill shown in FIG. 1;

FIG. 5 is a plan view of the combined drill and drill countersink in which the drilling point possesses the configuration seen in FIG. 4; and FIG. 6 is a modified drill and drill countersink in which the drill body is removably telescoped into the countersink body.

DETAILED DESCRIPTION OF THE INVENTION

The improved drill is shown in FIGS. 1 and 2, and certain of its important physical configurations are shown in greater detail in FIGS. 3 and 4. The drill 10 is made up of a carbide body 11 brazed onto a tool steel body 12 in order to be economical in the use of the more expensive carbide material. It is preferred that the brazed joint 13 should have a shape which will withstand the necessary torque transfer from the body 12 which is chucked into the drilling tool to the carbide body 11.

The carbide body 11 is formed with opposite essentially or substantially flat surfaces 14 which taper toward the point 15 at an included angle A of substantially 10°. In some cases the surfaces 14 may have a slight concavity, depending on the grinding operation employed to form the same, and as shown these surfaces or flutes provide for chip clearance. The forward margins or flat faces 14A at the ends of the flat surfaces 14 are ground to form an angular drilling point in which the opposite cutting edges 16 are formed at an included point angle B of substantially 35°. Each cutting edge 16 has a negative rake angle C of about 5°, and a relief angle D of about 55°.

The rake angle C is usually about one-half of the angle A and since angle A may vary the angle C may also vary. The lip relief angle D is the angle that results when the plane of the relief surface 14A intersects with the cylindrical surface of the sides 11A. In the drill shown the lip relief angle D is 55°, and this is the result of forming the relief surface 14A at about 25° during the grinding.

It can be seen in FIG. 3 that the surfaces 14 do not change the diametrical size of the carbide body 11 except where the cutting edges 16 are formed to provide the point angle for drilling. Since the diameter of the body 11 is essentially uniform all the way to the cutting edges 16, and the point is symmetrically centered on the body 11, the hole drilled with this tool remains uniform and meets the requirement for holding accuracy as the drill body is supported by the hole side wall and that supports the cutting edges. The relief angles imparted to the cutting edges 16 form a chisel edge at the point 15, and the chisel point, as visualized in FIG. 2, is thinned by the tapered surfaces 14 to improve the rate of penetration of the drill in a drilling operation.

Referring again to FIGS. 3 and 4 in particular, the drill end of the body is seen to be formed with the substantially flat relief faces 14A which are symmetrical and converge toward the axis of the drill body. These surfaces meet the surfaces 14 along the first edges 16 which are the cutting edges, and meet along second edges 16A spaced behind cutting edges 16 in the direction of drill rotation. The surfaces 14A converge along the edges 16 and 16A from the side margins 11A, which are continuations of the cylindrical shape of the body 11, to an angular chisel shaped drilling edge 15. These surfaces 14A intersect the respective cutting edges 16 and form relief surfaces which have an angle of lay back to provide for clearance behind the cutting edges. It is pointed out above that in grinding the relief surfaces 14A there is formed a lip relief which has an angle D as measured from the cutting edge 16, of about 55°. Such a lip relief angle of 55° can only be obtained when the surfaces 14A have a lay back angle which is about 25° due to the geometry of the drill point configuration. In forming the surfaces 14A at the indicated lay back angles the intersection of these surfaces results in forming a line 15 which is not radial but at some angle dependent upon the magnitude of the relief angles for surfaces 14A which lay back of surfaces perpendicular to the axis of the drill body. As a result, the line of intersection, or chisel edge 15 is directed at an angle to the cutting edges 16 which is greater than 90° as measured oppositely to the direction of drill rotation. This is called the chisel angle E.

It is particularly important, in drilling composite non-metallic multi-ply laminated materials (useful in the aerospace and aircraft industries), to form holes for fasteners which are precise in size and do not impair the strength of the material being drilled to receive such fasteners. It has been found that the use of conventional commercial carbide drills produce unsatisfactory results when drilling such non-metallic laminated graphite-epoxy composite materials for the reasons that the conventional drills cause top ply delamination, bottom ply delamination, excessive heat damage to the material because of the abrasive characteristic, poor hole size quality, and poor tool life. On the other hand, a drill having the physical configuration above described overcomes all of the problems attendant on the use of conventional carbide drills, so that there is no delamination taking place, the quality of the drilled hole is within the desired tolerance, minimal heat rise occurs because with the thin tapered drill configuration heat is transferred rapidly out of the composite material and away from the drill point, tool life is improved, and the configuration of the drilling point permits economical and minimum loss of material on regrinding.

In FIG. 5 a combined drill 11A and countersink 19 are illustrated. This tool has the drill 11A and countersink 19 formed from carbide and brazed along the line 20 to a body of tool steel 21 having its butt end shaped to be received in a suitable power tool. The drill 11A has the same characteristic configuration as that described for the drill of FIGS. 1 to 4. The countersink 19 has cutting edges 22 shaped to produce a countersink seat having an included angle of about 100°, but this may vary depending on requirements. The cutting edges 22 have spiral relief surface 23 having an angle of about 9°, and a rake angle 24 of about 8°.

In FIG. 6 the drill 11A is separately formed and has its shank 11B telescoped in the axial bore 25 in the countersink body 19 and the tool body 21. The drill shank 11B is secured in position by set screw 26 abutting a flat surface as is well understood. The advantage of forming the two parts separately is to achieve economy and the ability to regrind the drill a number of times before it must be replaced. The countersink is not subjected to the work load of the drill and can be reused numerous times before regrinding is required.

The foregoing drill and countersink have advantages not heretofore found. Such advantages reside in the simplicity of the drill design which make regrinding easy, the superior performance of the drill which easily handles the graphite-epoxy materials with a penetration rate that exceeds other drills and does not delaminate the composite material found to be so useful.

It should now be understood that the unique features of the present invention reside in the combination of flat flute drill and countersink, the flat flute configuration of the drill without relief on the drill diameter, the drill point configuration and geometry which makes it superior for drilling highly abrasive composite graphite-epoxy materials, and the ease with which the drill point geometry may be produced as to the point angle, chisel width at the tip and the lip relief for improved feed rates, tool life, and hole size quality.

What is claimed is:

1. A drill for producing holes of close tolerance in non-ferrous and non-metallic composite materials, said drill comprising an axially elongated body having a cylindrical form with diametrally opposite substantially flat first surfaces which taper convergently toward one end of said body from the cylindrical body remote from said one end, said first surfaces having diametrally opposite margins substantially coextensive with said first flat surface and conforming to the cylindrical shape of said elongated body, and said one end of said body being formed with similar substantially flat drill point surfaces convergently directed toward the longitudinal axis of said body from each of said opposite side margins, said drill point surfaces and said first surfaces meeting along first edges forming the cutting edges for said drill and meeting along second edges spaced behind said cutting edges in the direction of drill rotation, said drill point surfaces being oppositely angled relative to each other to lay back of said associated cutting edges and directed to converge from said opposite margins to intersect along a line which constitutes a chisel edge on said one end of said body.

2. The drill set forth in claim 1 wherein said cutting edges are symmetrically angled relative to the body axis and form an included point angle of about 35° which is substantially constant and independent of changes in the diameter of said body.

3. The drill set forth in claim 1 wherein said substantially flat first surfaces form with the longitudinal axis of said body an included angle of substantially 10° which is substantially constant and independent of changes in the diameter of said body.

4. The drill set forth in claim 1 wherein said chisel edge is directed at an angle to said opposite cutting edges greater than 90° as measured oppositely to the direction of drill rotation.

5. The drill set forth in claim 1 wherein a second cylindrical body is carried by said first mentioned body, said second body having a diameter larger than said first mentioned body and formed with a countersink drill face presented to said first mentioned body in position to perform a countersink operative in sequence with said cutting edges forming a hole.

6. The drill set forth in claim 5 wherein said second body is integral with said first mentioned body.

7. The drill set forth in claim 5 wherein said first mentioned body telescopes into said second body, and means secures said bodies in predetermined positions of cooperation.

* * * * *